US009705942B2

(12) United States Patent
Ghaskadvi

(10) Patent No.: US 9,705,942 B2
(45) Date of Patent: Jul. 11, 2017

(54) PROGRESSIVE PLAYBACK

(75) Inventor: Vijay S. Ghaskadvi, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 774 days.

(21) Appl. No.: 11/848,293

(22) Filed: Aug. 31, 2007

(65) Prior Publication Data

US 2014/0006450 A1    Jan. 2, 2014

(51) Int. Cl.
*G06F 17/30* (2006.01)
*H04L 29/06* (2006.01)

(52) U.S. Cl.
CPC .................... *H04L 65/40* (2013.01)

(58) Field of Classification Search
CPC ......... G06F 17/30286; G06F 17/30595; G06F 17/30607; G06Q 10/10; G06Q 40/10
USPC .................. 707/104.1; 709/231; 389/95, 125
See application file for complete search history.

(56) References Cited

U.S. PATENT DOCUMENTS

2004/0249969 A1 * 12/2004 Price ............................ 709/231
2005/0019015 A1 *  1/2005 Ackley et al. .................. 386/95
2006/0095472 A1 *  5/2006 Krikorian et al. .......... 707/104.1

* cited by examiner

*Primary Examiner* — Cam-Y Truong
(74) *Attorney, Agent, or Firm* — Kilpatrick Townsend & Stockton LLP

(57) ABSTRACT

Methods and apparatus provide for a progressive player to allow for a user to subscribe to media content. The media content can be organized according to a media orchestration descriptor (MOD). The MOD identifies each segment (i.e. media element, media asset) of the media content and indicates relationships among the segments to define a presentation of the segments during playback of the media content. Immediately, in response to subscribing to the media content, the progressive player initiates playback of the media content in conjunction with downloading the media content to a buffer. Playback of the media content is controlled with respect to the playback time of the amount of buffered media content, where the buffered media content comprises media content in the buffer that has been downloaded but not yet played back.

15 Claims, 7 Drawing Sheets

PROGRESSIVE PLAYBACK

BACKGROUND

Conventional computer systems allow for the production and distribution of multimedia data, including video, audio and image data. Such production is increasing at a phenomenal rate due to the growing popularity of the Internet, the growing affordability of personal computers capable of efficiently processing multimedia data to provide a pleasing experience for users, as well as the fact that multimedia data is far superior to text-only data in conveying content-rich information.

People now access and use multimedia data in numerous ways. One way that people access multimedia data is over a network. For example, people using web browsers on personal computers now access multimedia data by surfing the World Wide Web via the Internet. Countless numbers of content providers link multimedia data to web pages accessible by people using web browsers. Today, persons using web browsers can access a web page from a web server operated by a content provider to view video clips, listen to audio clips, or view images made available by the content provider.

When a client requests a piece of media content such as digital video, audio, or some other sampled content from a server, the client typically provides the global address of the content in the form of a Uniform Resource Locator (URL). A server then accesses the content and sends or "streams" it to the client as a continuous data stream.

There are various file formats for streaming media content and composite media streams. Regardless of the streaming file format used, an individual data stream may contain a sequence of digital data sets or units. The units can represent an image, sound, or some other stimuli that is perceived by a human to be continuously varying. The client can render the units individually, or in sequence, to reproduce the original stimuli. For example, a video data stream includes a sequence of digitally specified graphics frames that are rendered in sequence to produce a moving picture.

A playlist file, for conventional systems, can contain information such as whether to play certain pieces of media content more than one time, which pieces of media content to play, the order in which to play referenced media content, and the like. Playlist files also can contain references to one or more media streams and describe how pieces of media are to be combined. Playlists do not contain the actual media data, but rather references to the media data. As a result, playlist files are typically small, generally only containing text, and are generally easy and computationally inexpensive to modify. References to a single piece of media may appear in many playlist files.

Conventional playlist files have the effect of combining several individual pieces of media content into one single complex piece of content, and they are important to providers of streaming media. They allow content providers to combine advertisements with other content, and therefore build a business based on advertising revenue. They allow Internet radio stations to create a playlist of broadcast songs. They also allow providers to brand their content by attaching previews or radio-station identifiers before or after the content.

Conventional playlists are implemented either on a client or on a server such as when the client implements a playlist, the playlist is typically downloaded from a server such as a Web server, a file server, and/or the like. The client interprets the playlist file to present a series of requests to one or more servers to access at least a portion of the content represented in the playlist. A server is generally not aware whether the client is requesting content based on a corresponding reference in the currently executed client-side playlist file or whether the client obtains the reference from a source other than a playlist. This is because, from the server's perspective, use of a client-side playlist is indistinguishable from a client communicating a number of non-playlist generated requests to the server to play several different pieces of content one after the other.

SUMMARY

Conventional media player applications that play content from a content publisher(s) suffer from a number of deficiencies. In particular, conventional systems do not adequately control the relationship between the rate of downloading the content and the rate of playback of the content. Thus, current player applications can often freeze or provide for a choppy playback as the rate of playback is equal to—or nearly equal to—the download rate. Other conventional player applications force the viewer to wait for the entire file to be downloaded before playback can begin, thereby wasting time and creating inconvenience in the user's experience.

Embodiments disclosed herein can significantly overcome such deficiencies and/or other deficiencies in the prior art. For example, embodiments herein provide a progressive player that allows for playback of media orchestration descriptors (MODs) progressively, without having to fully download all the segments (i.e. media assets, media elements) described in the MOD. The playback and download can go on simultaneously and such progressive playback prevents a choppy playback in case of slow download speeds. If the playback catches up with the download, the progressive player that is playing the media content described in the MOD enters a buffering state, thereby halting the execution of all the active media activities—such as, for example, banner ads, logo placement and overlay of ads if any.

In another embodiment, when downloaded media content has a total playback time that is less than a necessary amount, the playback is halted and the progressive player enters a buffering state. Additional media content is downloaded during the buffering state, but the progressive player does not resume playback until the playback time of the amount of downloaded buffered media content exceeds a sufficient amount where the sufficient amount is defined as greater than the necessary amount.

According to general embodiments, the progressive player allows for a user to subscribe to media content. The media content can be organized according to a MOD. The MOD identifies each segment (i.e. media element) of the media content and indicates relationships among the segments to define a presentation of the segments during playback of the media content. Immediately, in response to subscribing to the media content, the progressive player initiates playback of the media content in conjunction with downloading the media content to a buffer. Playback of the media content is controlled with respect to the playback time of the amount of buffered media content, where the buffered media content comprises media content in the buffer that has been downloaded but not yet played back.

Other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides an interface with distinct interaction models as explained herein that when performed (e.g. when executing) on the processor, operates as explained herein within the computerized device to perform all of the method embodiments and operations explained herein as embodiments of the invention. Thus, any computerized device that performs or is programmed to perform the processing explained herein is an embodiment of the invention.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems, Incorporated of San Jose, Calif.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Methods and apparatus provide for a progressive player to allow for a user to subscribe to media content. The media content can be organized according to a media orchestration descriptor (MOD). The MOD identifies each segment (i.e. media element, media asset) of the media content and indicates relationships among the segments to define a presentation of the segments during playback of the media content. Immediately, in response to subscribing to the media content, the progressive player initiates playback of the media content in conjunction with downloading the media content to a buffer. Playback of the media content is controlled with respect to the playback time of the amount of buffered media content, where the buffered media content comprises media content in the buffer that has been downloaded but not yet played back.

Thus, the progressive player provides for playback of MODs without having to fully download all the components (i.e. media assets, media elements) described in the MOD. The playback and download can go on simultaneously and such progressive playback prevents a choppy playback in case of slow download speeds. If the playback catches up with the download, the progressive player that is playing the media content described in the MOD enters a buffering state, thereby halting the execution of all the active media activities—such as, for example, playback of banner ads, logo placement and overlay of ads, if any.

Figure 1:
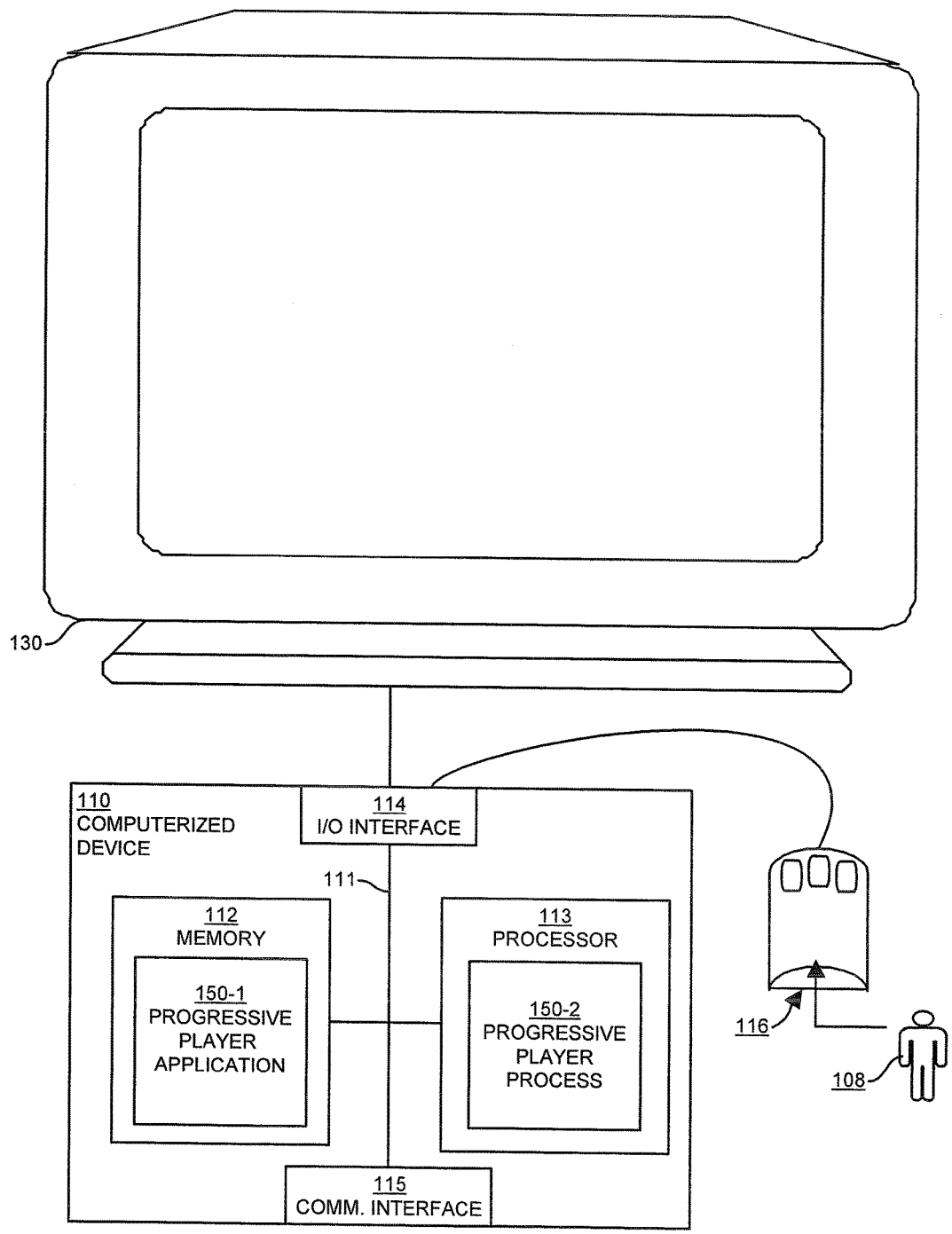
FIG. 1 is a block diagram of a computer system configured with a progressive player according to embodiments herein.

Turning now to FIG. 1, a block diagram illustrates an example of architecture for a computer system 110 that executes, runs, interprets, operates or otherwise performs a progressive player application 150-1 and/or progressive player process 150-2 (e.g. an executing version of the application 150-1 controlled by user 108) according to embodiments herein. The computer system 110 may be any type of computerized device such as a personal computer, a client computer system, workstation, portable computing device, console, laptop, network terminal or the like.

As shown in the present example, the computer system 110 includes an interconnection mechanism 111 such as a data bus, motherboard or other circuitry that couples a memory system 112, a processor 113, an input/output interface 114, and a display 130 presenting a graphical user interface 205 of the progressive player 150. An input device 116 (e.g., one or more user/developer controlled devices such as a keyboard, mouse, touch pad, etc.) couples to the computer system 110 and processor 113 through an input/output (I/O) interface 114.

The memory system 112 can be any type of computer readable medium and, in this example, is encoded with a progressive player application 150-1 that supports generation, display, and implementation of functional operations as will be further explained herein. During operation of the computer system 110, the processor 113 accesses the memory system 112 via the interconnect 111 in order to launch, run, execute, interpret or otherwise perform the logic instructions of the progressive player application 150-1. Execution of the progressive player application 150-1 in this manner produces the progressive player process 150-2. In other words, the progressive player process 150-2 represents one or more portions or runtime instances of the progressive player application 150-1 (or the entire application 150-1)

performing or executing within or upon the processor 113 in the computerized device 110 at runtime.

Those skilled in the art will understand that the computer system 110 may include other processes and/or software and hardware components, such as an operating system not shown in this example. A display 130 need not be coupled directly to computer system 110. For example, the progressive player application 150-1 can be executed on a remotely accessible computerized device via the network interface 115. In this instance, the graphical user interface 104 may be displayed locally to a user 108 of the remote computer, and execution of the processing herein may be client-server based.

During operation of the computer system 110, the processor 113 accesses the memory system 112 via the interconnect 111 in launch, run, execute, interpret or otherwise perform the logic instructions of the progressive player application 150-1. Execution of the progressive player application 150-1 in this manner produces processing functionality in a progressive player process 150-2. In other words, the progressive player process 150-2 represents one or more portions or runtime instances of the progressive player application 150-1 (or the entire targeted advertisement application 150-1) performing or executing within or upon the processor 113 in the computerized device 110 at runtime.

Figure 2:
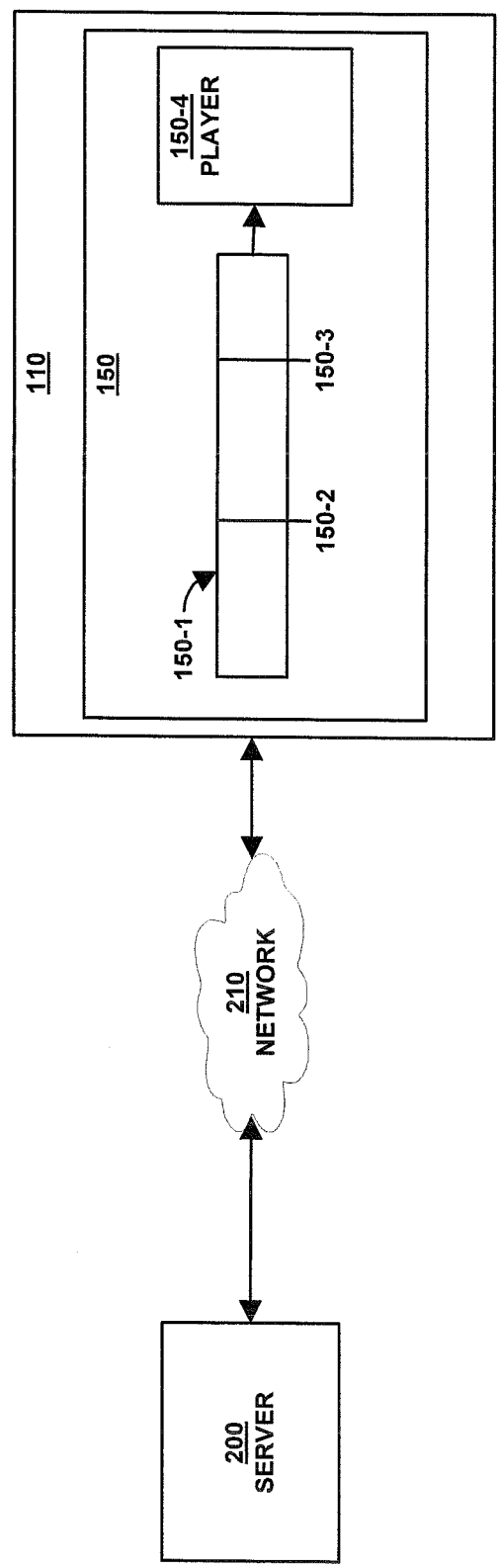
FIG. 2 is a block diagram of a network environment configured with a progressive player according to embodiments herein.

FIG. 2 is a block diagram of a network environment configured with a progressive player 150 according to embodiments herein. FIG. 2 includes a server 200 communicating with a client 110 over a network 210. For example, segments (i.e. media elements) of the media content that is described in a MOD can reside on the server (or at other computer networks). The server 200 can locate and transmit such segments to the client 110. The progressive player 150 provides a buffer 150-1 to temporarily store the transmitted (i.e. downloaded) media content prior to the media content being sent to a media player 150-4 for playback. The buffer 150-1 can be partitioned according to a necessary buffer 150-2 and a sufficient buffer 150-3 in order to control playback of the media content. The progressive player 150 is illustrated as being implemented on the client 110, however, it is understood that aspects of the progressive player 150 can reside and run on the server 200 and/or can be shared across the client 110 and the server 200.

If media content (e.g. streaming video) is playing at the player 150-4 and there's not enough "necessary" additional data in the buffer 150-1, it enters a buffering state. The "necessary" data amount can be termed as a necessary buffer 150-2. The necessary buffer 150-2 defines the amount of additional media content that is necessary to keep playing media content (e.g. streaming video) in the player 150-4 and is expressed in units of time (e.g. seconds). Thus, a necessary buffer 150-2 (i.e. the amount of "necessary" media content) of 5 seconds means that there must be enough data in the necessary buffer 150-2 to keep the media player 150-4 playing back the media content for 5 seconds without downloading any additional media content. For example, where the necessary buffer 150-2 is set for 10 seconds, then during playback, as soon as there's less than or equal to 10 seconds worth of buffered "necessary" media content, the progressive player 150 enters a buffering state—which halts playback but allows for continued downloading and buffering of media content.

Although additional media content is downloaded during the buffering state, thereby increasing the amount of buffered media content, the progressive player 150 does not resume playback when the amount of buffered media content exceeds the necessary buffer 150-2 amount.

Instead, the progressive player 150 defines a different buffer of downloaded media content, larger than the necessary buffer 150-2, called a "sufficient" buffer 150-3 which must be met in order to get out of the buffering state and to resume playback. If, for example, the progressive player 150 is in the buffering state and halts playback when there's less than 10 seconds worth of "necessary" data 150-2 available, the progressive player 150 can have a sufficient buffer 150-3 defined for 20 seconds of downloaded media content. Thus, in this example, the progressive player 150 resumes playback only after there is at least 20 seconds worth of media content that has been downloaded. Hence, the progressive player 150 ensures that once playback resumes, the buffering state will not be entered into again for at least another 10 seconds (i.e. 20 seconds minus 10 seconds).

Additionally, it is understood that the necessary buffer 150-2 and the sufficient buffer 150-3 can represent an amount of media content defined according to playback time. Thus, a particular span of playback time in the buffer can include, according to the MOD, a presentation of a plurality of media segments that are organized for parallel execution.

Figure 3:
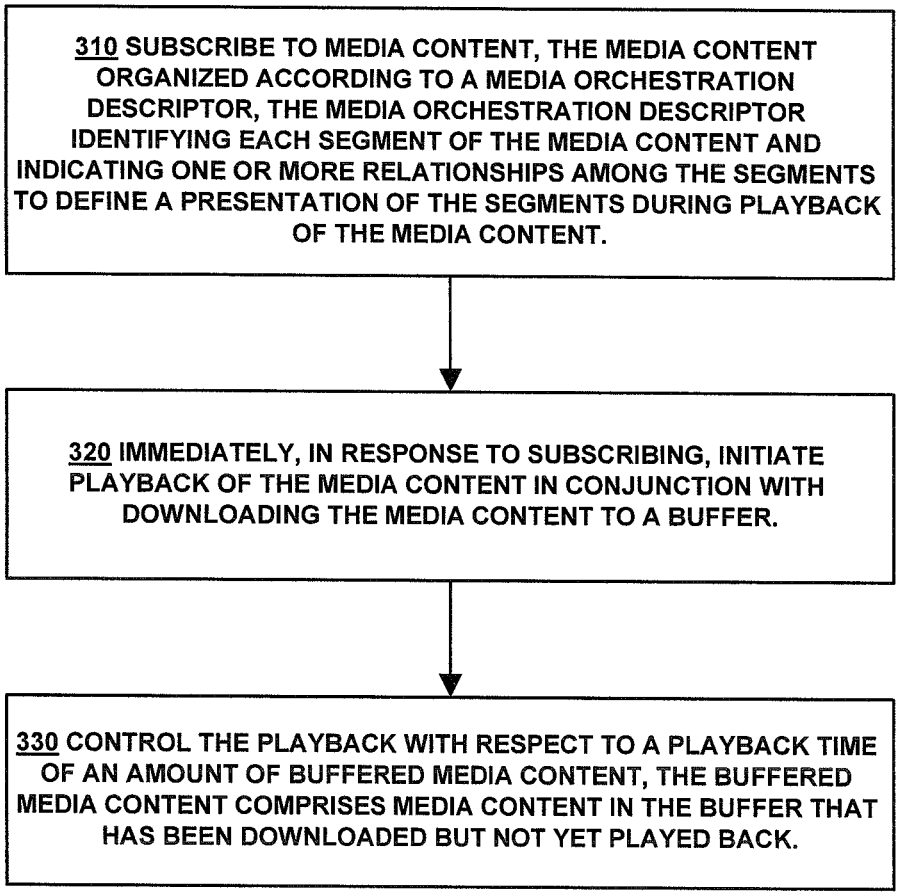
FIG. 3 is a flowchart of processing steps performed by a progressive player to control the playback of the downloaded media content according to embodiments herein.

FIG. 3 is a flowchart 300 of processing steps performed by a progressive player 150 to control the playback of the downloaded media content according to embodiments herein. At step 310, the progressive player 150 allows a user to subscribe to media content, such as a feed of TV episode(s), audio, and/or streaming video. The media content is organized according to a media orchestration descriptor (MOD). The MOD identifies each segment (i.e. media element, media asset) of the media content and indicates relationships among the segments to define a presentation of the segments during playback of the media content. Such relationships can represent that certain segments are to played simultaneously or that a particular segment (such as an advertisement) is to be overlayed upon a video segment as the video segment is played back.

The MOD can be in an eXtensible markup language (XML) format used for defining media orchestration (i.e. presenting and sequencing of media segments) in a media player 150-4. The MOD represents pre-defined user interface regions and media elements (i.e. media segments of the media content) such as, for example, videos, advertisements, graphics and images which are bound to those regions. Tags such as <seq> and <par> further define containers for the media elements to indicate sequential or parallel execution of one or media elements, respectively. A parallel container in the MOD is denoted by <par> which can include one or more media elements (i.e. media components, media assets, media segments, media effects) of the media content. The duration of a parallel container is calculated as the duration of the longest media elements within the parallel container. For example, if the duration of three videos within a parallel container is 70 seconds, 25 seconds and 55 seconds, respectively, then the duration of the parallel container is calculated to be 70 seconds.

A sequential container, denoted by <seq>, has a duration calculated to be the sum of each duration of media elements within the sequential container. Thus, if the duration of three videos within the sequential container were respectively 70 seconds, 25 seconds and 55 seconds, then the duration of the sequential container is calculated to be 150 seconds.

Timing attributes for the media elements organized in the MOD can be included to indicate when the media elements are played back, such as <begin>, <end> and <dur>. The media elements referenced by the MOD can be downloaded, stored on to a local disk on the user's computer, and/or placed in a buffer 150-1 that is communicating with the user's media player 150-4.

At step 320, immediately in response to subscribing to the media content, the progressive player 150 initiates playback of the media content in conjunction with downloading the media content to a buffer 150-1. Specifically, the progressive player 150 commences playback when at least one segment of the media content has been fully downloaded to the buffer 150-1. Further, in response to subscribing, the progressive player 150 downloads all segments of the media content described in the MOD that are lightweight resources to the buffer 150-1. Such lightweight resources are identified by the progressive player 150 as, for example, one or more images, banner advertisements, logos, and graphics.

In addition, the progressive player 150 downloads one or more heavyweight resources according to a sequence. The sequence corresponds to the order of presentation as defined in the media orchestration descriptor. Thus, a heavyweight resource that the MOD seeks to present early in the presentation will be downloaded first. Those heavyweight resources which are not to be presented until later during playback are scheduled for downloading later in the sequence. Such heavyweight resources are identified by the progressive player 150 as video files.

At step 330, the progressive player 150 controls the playback of the downloaded media content with respect to a playback time of an amount of buffered media content, where the buffered media content comprises media content in the buffer that has been downloaded but not yet played back.

Figure 4:
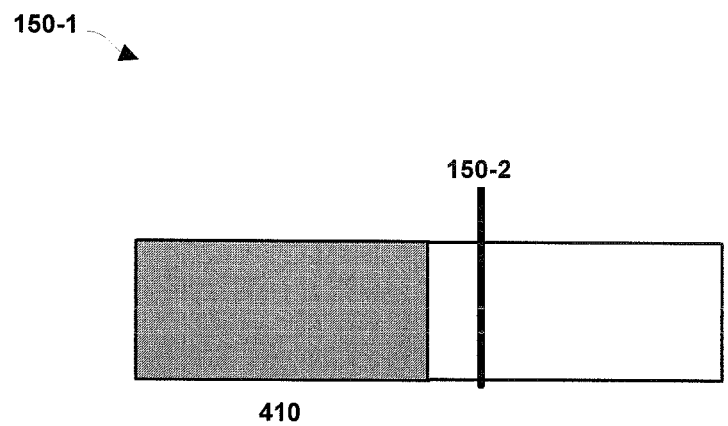
FIG. 4 is a block diagram of a progressive player that it is in a buffering state according to embodiments herein.

FIG. 4 is a block diagram of a progressive player 150 that it is in a buffering state according to embodiments herein. As illustrated in FIG. 4, the buffer 150-1 contains only one segment 410 that has been downloaded to the buffer 150-1. A necessary buffer 150-2 is defined to include a predetermined amount of media content in the buffer 150-1. According to FIG. 4, the amount of downloaded media content in the buffer 150-1 is less than the necessary buffer 150-2.

Figure 5:
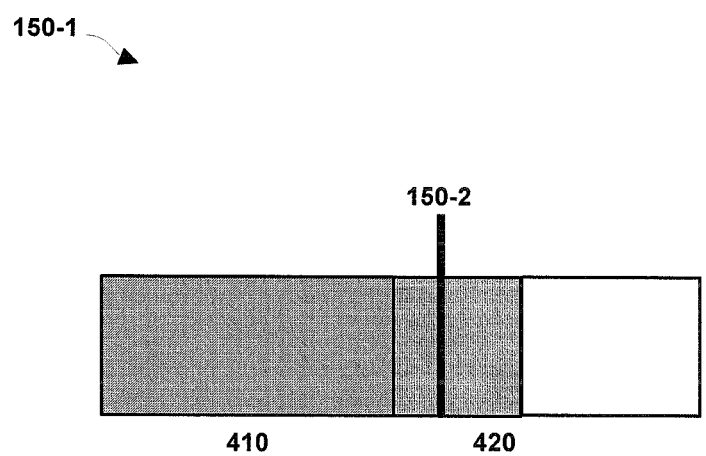
FIG. 5 is a block diagram of a necessary buffer of a progressive player according to embodiments herein.

FIG. 5 is a block diagram of a necessary buffer of a progressive player 150 according to embodiments herein. As illustrated in FIG. 5, the buffer 150-1 contains two sequential segments 410, 420 that have been downloaded to the buffer 150-1. A necessary buffer 150-2 is defined to include a predetermined amount of media content in the buffer 150-1. According to FIG. 5, the total playback time for the amount of downloaded media content in the buffer 150-1 exceeds the necessary buffer 150-2.

Figure 6:
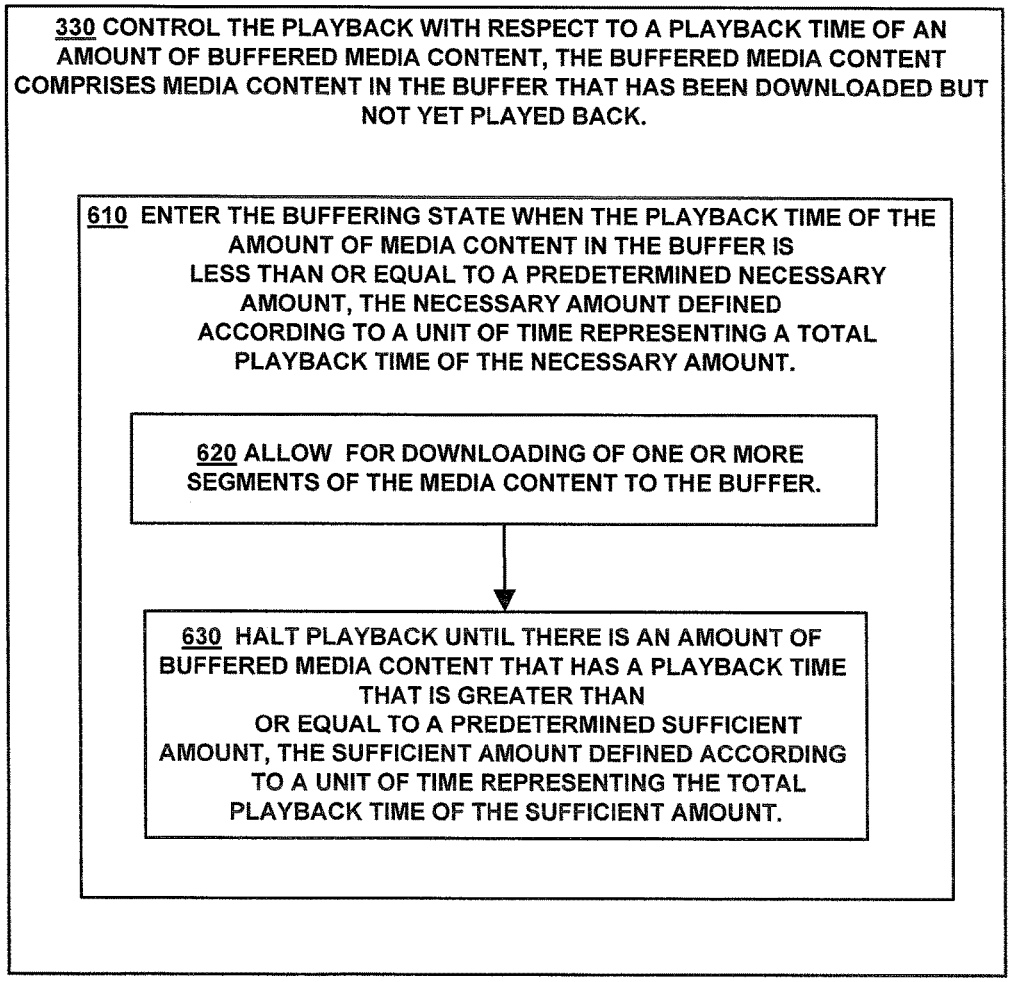
FIG. 6 is a flowchart of processing steps performed by a progressive player to enter a buffering state according to embodiments herein.

The proceeding discussion for FIG. 6 relates to both FIGS. 4 and 5 specifically and to all other figures and embodiments generally. It is understood that segment 410 (and/or segment 420) can be a segment (i.e. an element, a component) of a parallel container of the MOD. Thus, if segment 410 has the longest duration of all segments in the parallel container, then those other segments of shorter duration for that parallel container exist in the buffer along with segment 410. So as segment 410 is executed for playback, the other segments of the parallel container will be executed in parallel—but not necessarily for the same amount of time as is required for segment 410. However, with regards to segment 410 being part of a parallel container, the total amount of content media that is considered for the necessary buffer 150-2 (and/or the sufficient buffer 150-3) will be the duration of segment 410 since all other parallel segments have a duration that is less than segment 410. For example, where segment 410 has a duration of 70 seconds, and two other parallel segments have durations of 25 seconds and 55 seconds, respectively, then the total amount of playback time in the buffer between those three parallel segments is 70 seconds.

FIG. 6 is a flowchart 600 of processing steps performed by a progressive player 150 to enter a buffering state according to embodiments herein. At step 610, as illustrated in FIG. 4, the progressive player 150 enters a buffering state when the playback time of the entire amount of media content in the buffer 150-1 is less than or equal to a predetermined necessary amount 150-2. The necessary amount 150-2 can be defined according to a unit of time that represents a total playback time of the necessary amount. Thus, if the necessary amount 150-2 (i.e. necessary buffer) is defined to be 15 seconds, then the progressive player 150 enters the buffering state when the buffer 150-1 contains downloaded media content that would not provide the player 150-4 with enough content to play for more than 15 seconds.

At step 620, as illustrated in FIG. 5, the progressive player 150 allows for downloading of one or more segments of the media content to the buffer. Thus, even though the progressive player 150 is in the buffering state, the buffer continues 150-1 to receive and collect media content. While in the buffering state, at step 630, the progressive player 150 halts playback until there is an amount of buffered media content that has a playback time that is greater than or equal to a predetermined sufficient amount (i.e. sufficient buffer). The sufficient amount can be defined according to a unit of time representing the total playback time of the sufficient amount in the buffer 150-1.

Further, it is understood that certain embodiments of the progressive player 150 need not require that a segment of the media content be completely downloaded to the buffer 150-1 in order to determine if the addition of that segment in the buffer 150-1 exceeds the necessary buffer 150-2 and/or the sufficient buffer 150-3. In other words, if during the download of that segment, the total playback time for the amount of downloaded media content in the buffer exceeds the necessary buffer 150-2 and/or the sufficient buffer 150-3, then the progressive player 150 can perform any necessary actions (e.g. enter the buffering state, halt playback, resume playback) even though that segment has only been partially downloaded.

Figure 7:
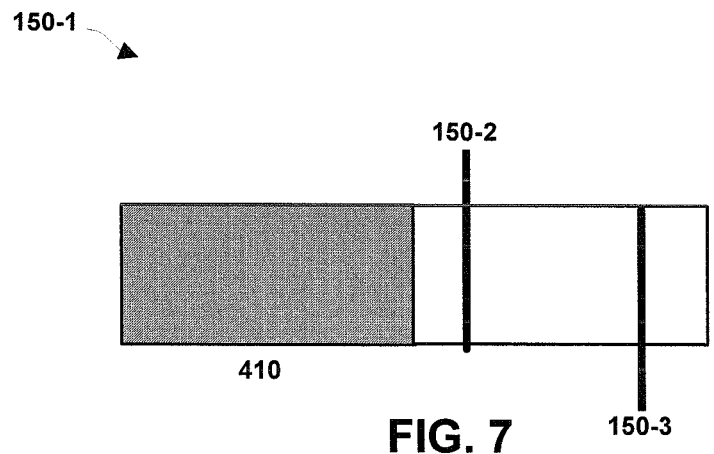
FIG. 7 is a block diagram of a sufficient buffer of a progressive player according to embodiments herein.

FIG. 7 is a block diagram of a sufficient buffer of a progressive player according to embodiments herein. As illustrated in FIG. 7, the buffer 150-1 contains only one segment 410 that has been downloaded to the buffer 150-1. A necessary buffer 150-2 is defined to include a predetermined amount of media content in the buffer 150-1. According to FIG. 7, the playback time for the amount of downloaded media content in the buffer 150-1 is less than the necessary buffer 150-2. In addition, a sufficient buffer 150-3 is also defined to include a predetermined amount of media content in the buffer 150-1.

Figure 8:
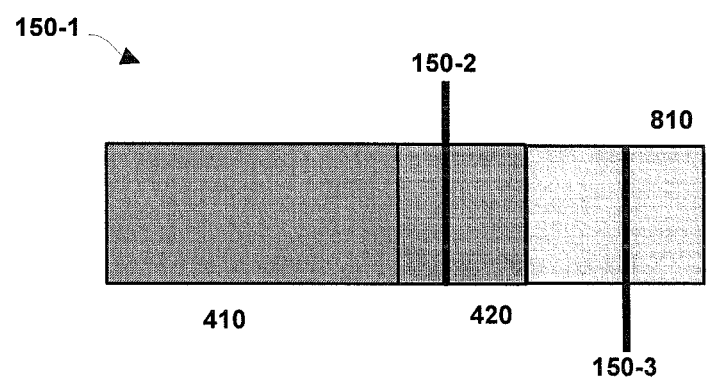
FIG. 8 is a block diagram of a sufficient buffer of a progressive player that it is terminating a buffering state according to embodiments herein.

FIG. 8 is a block diagram of a sufficient buffer of a progressive player that it is terminating a buffering state according to embodiments herein. As illustrated in FIG. 8, the buffer 150-1 contains three segments 410, 420, 810 that have been downloaded to the buffer 150-1. A necessary buffer 150-2 is defined to include a predetermined amount of media content in the buffer 150-1. According to FIG. 8, the total playback time for the amount of downloaded media content in the buffer 150-1 exceeds both the necessary buffer 150-2 and the sufficient buffer 150-3. The proceeding discussion for FIG. 9 relates to both FIGS. 7 and 8 specifically and to all other figures and embodiments generally.

Figure 9:
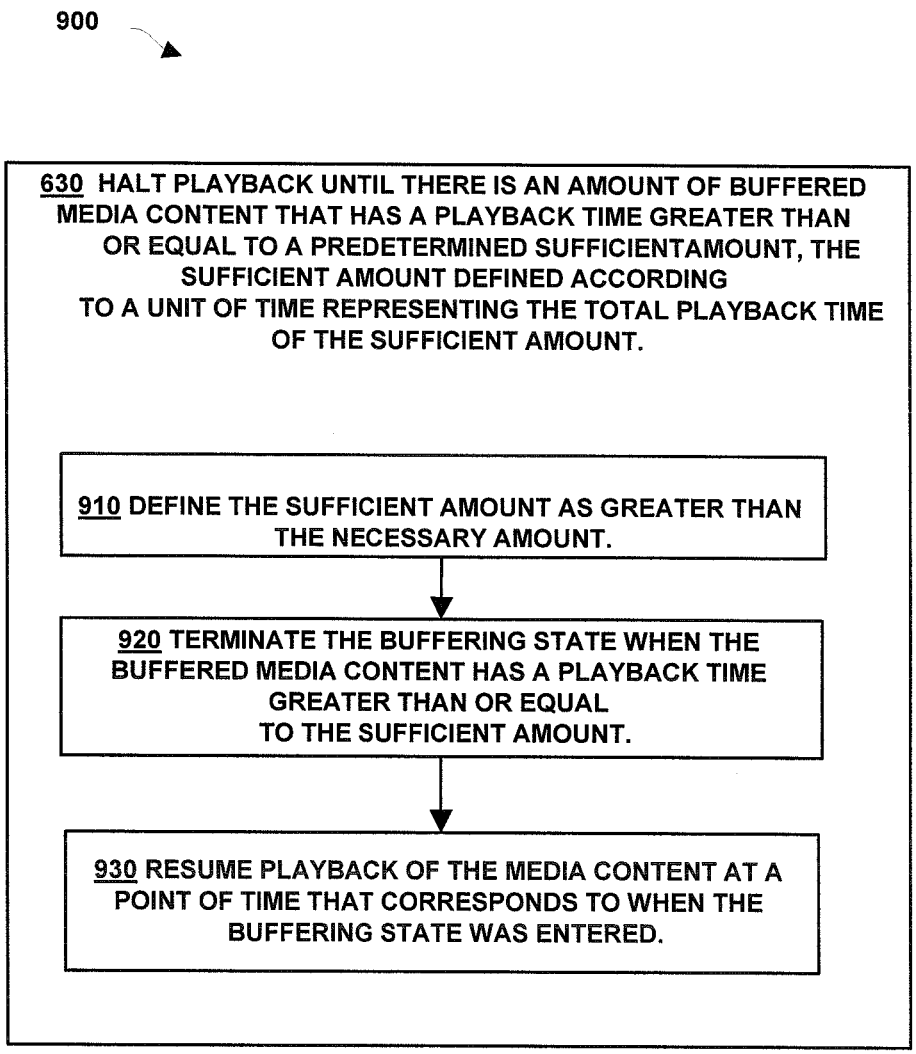
FIG. 9 is a flowchart of processing steps performed by a progressive player to resume playback of media content in accordance with media content in a sufficient buffer according to embodiments herein.

FIG. 9 is a flowchart 900 of processing steps performed by a progressive player 150 resuming playback of media content in accordance with media content in a sufficient buffer according to embodiments herein. At step 910, the progressive player 150 defines the sufficient amount 150-3 as greater than the necessary amount 150-2. As illustrated in FIG. 7, the buffer 150-1 only contains one segment 410 of downloaded media content. Segment 410 provides the buffer 150-1 with an amount of media content that has a playback time that is less than the amount required by the necessary buffer 150-2 (i.e. necessary amount). Thus, FIG. 7 illustrates the progressive player 150 in the buffering state.

At step 920, the progressive player 150 terminates the buffering state when the buffered media content has a playback time that is greater than or equal to the sufficient amount 150-3. For example, while in the buffering state, the progressive player 150 can continue to download segments 420, 810 of the media content. Segment 420 provides the buffer 150-1 with enough media content to exceed the necessary buffer 150-2. However, to resume playback, the progressive player 150 requires that the buffer 150-1 contain enough media content with a playback time that exceeds the sufficient buffer 150-3. Once segment 810 is downloaded (or during the download of segment 810), now the buffer 150-1 contains enough downloaded media content to have a playback time that exceeds the predetermined amount of the sufficient buffer 150-3. At step 930, the progressive player 150 resumes playback of the media content at a point of time within the media content that corresponds to when the buffering state was entered.

The following code is an example of a media orchestration descriptor compatible with the progressive player 150 according to embodiments herein.

```
<smil xmlns="http://www.w3.org/2005/SMIL21/Language">
<head>
<layout>
<region id="banner" />
<region id="content" />
<region id="logo" />
</layout>
</head>
<body>
<par>
<seq>
<image region="logo" src="http://contentServer/ads/ad1.jpg"
 dur="70s"/>
≤image region="logo" src="http://contentServer/ads/Pirates3.png"
 dur="82.149s"/>
</seq>
<seq>
<video region="content" src="http://contentServer/Pirates3-1.flv"
 dur="20.58s" />
<video region="content" src="http://contentServer/Pirates3-2.flv"
 dur="17.07s" />
<video region="content" src="http://contentServer/Pirates3-3.flv"
 dur="21.2s" />
<video region="content" src="http://contentServer/Pirates3-4.flv"
 dur="31.579s" />
<video region="content" src="http://contentServer/Pirates3-5.flv"
 dur="24.88s" />
<video region="content" src="http://contentServer/Pirates3-6.flv"
 dur="36.842s" />
</seq>
<seq>
<image region="banner" src="http://contentServer/ads/ad1.jpg"
 dur="50s" />
<image region="banner" src="http://contentServer/ads/ad2.gif"
 dur="50s" />
<image region="banner" src="http://contentServer/ads/ad3.jpg"
 dur="52.149s" />
</seq>
</par>
</body>
  </smil>
```

It is noted that example configurations disclosed herein include the progressive player application 150-1 itself (i.e., in the form of un-executed or non-performing logic instructions and/or data). The progressive player application 150-1 may be stored on a computer readable medium (such as a floppy disk), hard disk, electronic, magnetic, optical, or other computer readable medium.

Note again that techniques herein are well suited for a progressive player 150 configured to control playback of media content with respect to an amount of buffered media content However, it should be noted that embodiments herein are not limited to use in such applications and that the techniques discussed herein are well suited for other applications as well.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing an extensible master-slave user interface with distinct interaction models as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claim is:

1. A computer-implemented method comprising:
subscribing to media content by using a computer system, the media content comprising a plurality of segments organized according to a media orchestration descriptor, the media orchestration descriptor identifying the plurality of segments of the media content and indicating at least one relationship among the plurality of segments to define a presentation of the plurality of segments during playback of the media content;

in response to subscribing, initiating, by using the computer system, playback of the media content in conjunction with downloading a first subset of the plurality of segments to a buffer;

determining, by using the computer system, a total playback time of the first subset of segments downloaded to the buffer that has not been played back, wherein the total playback time is determined by:

identifying a first playback duration of a first segment of the first subset of segments and a second playback duration of a second segment of first subset of segments, and selecting the first playback duration as the total playback time based on the first playback duration exceeding the second playback duration and the first segment and the second segment being organized for parallel execution according to the media descriptor;

halting the playback in response to determining that the total playback time is less than a predetermined necessary amount of playback time;

downloading, by using the computer system, a second subset of the plurality of segments to the buffer; and resuming, by using the computer system, the playback in response to determining that the total playback time of the first subset of segments and the second subset of segments downloaded to the buffer is at least equal to a predetermined sufficient amount of playback time, wherein the predetermined sufficient amount of playback time is defined to be greater than the predetermined necessary amount of playback time.

2. The method as in claim 1, further comprising:
entering a buffering state when all of the first subset of segments in the buffer have been played back.

3. The method as in claim 1,
wherein resuming the playback of the first subset of segments comprises resuming the playback of the first subset of segments at a point of time within the media content that corresponds to when the playback was halted.

4. The method as in claim 1, wherein initiating playback of the media content in conjunction with downloading the first subset of segments to the buffer includes: commencing playback when the first subset of segments has been fully downloaded to the buffer.

5. The method as in claim 1, wherein initiating playback of the media content in conjunction with downloading the first subset of segments to the buffer includes:
determining that the first subset of segments comprises at least one lightweight resource and at least two heavyweight resources;
downloading the at least one lightweight resource; and
downloading the at least two heavyweight resources according to a sequence, wherein the sequence corresponds to an order of presentation of the heavyweight resources as defined in the media orchestration descriptor.

6. The method as in claim 5, further comprising:
wherein the at least one lightweight resource comprises at least one of an image, an advertisement, a logo, and a graphic; and wherein one of the heavyweight resources comprises a video file.

7. The method as in claim 6, wherein the at least one lightweight resource is to be played back during presentation of the video file.

8. The method as in claim 1, wherein the second subset of segments includes a third segment and a fourth segment organized to be executed in parallel according to the media orchestration descriptor, the third segment having a third playback duration and the fourth segment having a fourth playback duration, wherein the third playback duration is longer than the fourth playback duration; and
wherein the total playback time of the first subset of segments and the second subset of segments downloaded to the buffer includes the third playback duration of the third segment but not the fourth playback duration of the fourth segment.

9. The method of claim 1, wherein the predetermined necessary amount of playback time comprises an amount of time that the media content can be played without downloading additional segments of the media content to the buffer.

10. A non-transitory computer readable medium comprising executable instructions encoded thereon operable on a computerized device to perform processing comprising:
instructions for subscribing to media content, the media content comprising a plurality of segments organized according to a media orchestration descriptor, the media orchestration descriptor identifying the plurality of segments of the media content and indicating at least one relationship among the plurality of segments to define a presentation of the plurality of segments during playback of the media content;
instructions for initiating playback of a plurality of segments of the media content in conjunction with downloading a first subset of the plurality of segments of the media content to a buffer in response to subscribing the first subset of segments;
instructions for determining a total playback time of the first subset of segments downloaded to the buffer that has not been played back, wherein the total playback time is determined by:
identifying a first playback duration of a first segment of the first subset of segments and a second playback duration of a second segment of the first subset of segments, and
selecting the first playback duration as the total playback time based on the first playback duration exceeding the second playback duration and the first segment and the second segment being organized for parallel execution according to the media descriptor;
instructions for halting the playback in response to determining that the total playback time is less than a predetermined necessary amount of playback time;
instructions for downloading a second subset of the plurality of segments to the buffer; and
instructions for resuming the playback in response to determining that the total playback time of the first subset of segments and the second subset of downloaded to the buffer is at least equal to a predetermined sufficient amount of playback time, wherein the predetermined sufficient amount of playback time is defined to be greater than the predetermined necessary amount of playback time.

11. The computer readable medium as in claim 10, further comprising: instructions for entering a buffering state when all of the first subset of segments in the buffer have been played back.

12. The computer readable medium as in claim 10,
wherein resuming the playback of the first subset of segments further comprises resuming the playback of the media content at a point of time within the media content that corresponds to when the playback was halted.

13. The computer readable medium as in claim 10, wherein the instructions for initiating playback of the media content in conjunction with downloading the first subset of segments to the buffer include:

instructions for determining that the first subset of segments comprises at least one lightweight resource and at least two heavyweight resources;

instructions for downloading the at least one lightweight resource; and instructions for downloading the at least two heavyweight resources according to a sequence, wherein the sequence corresponds to an order of presentation of the heavyweight resources as defined in the media orchestration descriptor.

14. The computer readable medium as in claim 13, wherein the at least one lightweight resource comprises at least one of an image, a banner advertisement, a logo, and a graphic; and wherein one of the heavyweight resources comprises a video file.

15. A computer system comprising:

a processor;

a memory unit that stores instructions associated with an application executed by the processor; and an interconnect coupling the processor and the memory unit, enabling the computer system to execute the application and perform operations of:

subscribing to media content comprising a plurality of segments, the media content organized according to a media orchestration descriptor, the media orchestration descriptor identifying the plurality of segments of the media content and indicating at least one relationship among the plurality of segments to define a presentation of the plurality of segments during playback of the media content;

in response to subscribing, initiating playback of the media content in conjunction with downloading a first subset of the plurality of segments of the media content to a buffer;

determining a total playback time of the first subset of segments of the media content downloaded to the buffer that has not been played back, wherein the total playback time is determined by:

identifying a first playback duration of a first segment of the first subset of segments and a second playback duration of a second segment of the first subset of segments, and selecting the first playback duration as the total playback time based on the first playback duration exceeding the second playback duration and the first segment and the second segment being organized for parallel execution according to the media descriptor;

halting the playback in response to determining that the total playback time is less than a predetermined necessary amount of playback time;

downloading a second subset of the plurality of segments to the buffer; and resuming the playback in response to determining that the total playback time of the first subset of segments and the second subset of segments downloaded to the buffer is at least equal to a predetermined sufficient amount of playback time, wherein the predetermined sufficient amount of playback time is defined to be greater than the predetermined necessary amount of playback time.

\* \* \* \* \*